(12) United States Patent
Pattok et al.

(10) Patent No.: US 10,589,774 B2
(45) Date of Patent: Mar. 17, 2020

(54) COUNTER ROTATION STEERING WHEEL

(71) Applicant: STEERING SOLUTIONS IP HOLDING CORPORATION, Saginaw, MI (US)

(72) Inventors: Eric D. Pattok, Frankenmuth, MI (US); Joen C. Bodtker, Gaines, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/142,623

(22) Filed: Apr. 29, 2016

(65) Prior Publication Data

US 2016/0318542 A1 Nov. 3, 2016

Related U.S. Application Data

(60) Provisional application No. 62/155,589, filed on May 1, 2015.

(51) Int. Cl.
*B62D 1/22* (2006.01)
*B62D 5/00* (2006.01)

(52) U.S. Cl.
CPC .............. *B62D 1/22* (2013.01); *B62D 5/008* (2013.01)

(58) Field of Classification Search
CPC .................................. B62D 1/22; B62D 5/008
See application file for complete search history.

(56) References Cited

U.S. PATENT DOCUMENTS

| | | | |
|---|---|---|---|
| 1,795,566 A | 3/1931 | MacComb |
| 1,944,905 A | 1/1934 | Rowell |
| 2,465,825 A | 3/1949 | Tucker |
| 2,622,690 A | 12/1952 | Barenyi |
| 3,734,051 A | 5/1973 | Dahl |
| 3,910,597 A | 10/1975 | Seko |
| 4,013,034 A | 3/1977 | Cantley et al. |
| 4,315,117 A | 2/1982 | Kokubo et al. |
| 4,337,967 A | 7/1982 | Yoshida et al. |
| 4,368,454 A | 1/1983 | Pilatzki |

(Continued)

FOREIGN PATENT DOCUMENTS

| | | |
|---|---|---|
| CA | 1318833 C | 6/1993 |
| CN | 1722030 A | 1/2006 |

(Continued)

OTHER PUBLICATIONS

Second Office Action regarding related CN Pat. App. No. 201510204221.5; dated Mar. 10, 2017; 8 pages.

(Continued)

*Primary Examiner* — James A English
(74) *Attorney, Agent, or Firm* — Dickinson Wright PLLC

(57) ABSTRACT

A steering column assembly configured to couple to a steering wheel is provided. The assembly includes a steering column shaft having a first end and a second end, the second end configured to couple to the steering wheel. The assembly also includes an intermediate shaft coupled to the steering column shaft first end. The assembly further includes a steering input pinion coupled to the intermediate shaft. The assembly yet further includes a counter rotation mechanism configured to counter rotate rotational movement of the steering column assembly such that the steering wheel does not rotate.

19 Claims, 1 Drawing Sheet

(56) References Cited

U.S. PATENT DOCUMENTS

| | | |
|---|---|---|
| 4,429,588 A | 2/1984 | Emundts et al. |
| 4,485,371 A | 11/1984 | Yamada et al. |
| 4,503,300 A | 3/1985 | Lane, Jr. |
| 4,503,504 A | 3/1985 | Suzumura et al. |
| 4,561,323 A | 12/1985 | Stromberg |
| 4,603,599 A | 8/1986 | Matsuoka |
| 4,625,578 A | 12/1986 | Nishijima |
| 4,635,029 A | 1/1987 | Yamada |
| 4,638,287 A | 1/1987 | Umebayashi |
| 4,674,352 A | 6/1987 | Mizuno et al. |
| 4,691,587 A | 9/1987 | Farrand et al. |
| 4,715,463 A | 12/1987 | Shimizu |
| 4,766,326 A | 8/1988 | Hayashi et al. |
| 4,771,650 A | 9/1988 | Kerner |
| 4,771,846 A | 9/1988 | Venable et al. |
| 4,825,972 A | 5/1989 | Shimizu |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,072,628 A | 12/1991 | Oki |
| 5,240,284 A | 8/1993 | Takada et al. |
| 5,295,712 A | 3/1994 | Omura |
| 5,319,803 A | 6/1994 | Allen |
| 5,347,458 A | 9/1994 | Serizawa et al. |
| 5,465,632 A | 11/1995 | Oki et al. |
| 5,488,555 A | 1/1996 | Asgari |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,835,870 A * | 11/1998 | Kagawa .................. B62D 1/28 180/421 |
| 5,893,580 A | 4/1999 | Hoagland et al. |
| 5,911,789 A | 6/1999 | Keipert et al. |
| 6,070,686 A | 6/2000 | Pollmann |
| 6,109,651 A | 8/2000 | Frisch |
| 6,142,504 A | 11/2000 | Papandreou |
| 6,145,402 A | 11/2000 | Nishitani et al. |
| 6,170,862 B1 | 1/2001 | Hoagland et al. |
| 6,176,341 B1 | 1/2001 | Ansari |
| 6,227,571 B1 | 5/2001 | Sheng et al. |
| 6,301,534 B1 | 10/2001 | McDermott, Jr. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,394,218 B1 | 5/2002 | Heitzer |
| 6,419,043 B1 | 7/2002 | Duval et al. |
| 6,488,115 B1 | 12/2002 | Ozsoylu et al. |
| 6,548,969 B2 | 4/2003 | Ewbank et al. |
| 6,578,449 B1 | 6/2003 | Anspaugh et al. |
| 6,588,540 B2 | 7/2003 | Graber et al. |
| 6,612,393 B2 | 9/2003 | Bohner et al. |
| 6,644,432 B1 | 11/2003 | Yost et al. |
| 6,819,990 B2 | 11/2004 | Ichinose |
| 6,955,623 B2 | 10/2005 | Pattok |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,380,828 B2 | 6/2008 | Menjak et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,665,572 B2 | 2/2010 | Yamanaka et al. |
| 7,690,685 B2 | 4/2010 | Sasaoka |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,878,294 B2 * | 2/2011 | Morikawa ............ B62D 5/0415 180/204 |
| 7,894,951 B2 | 2/2011 | Norris et al. |
| 7,909,361 B2 | 3/2011 | Oblizajek et al. |
| 7,931,296 B2 | 4/2011 | Choi |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,170,725 B2 | 5/2012 | Chin et al. |
| 8,220,355 B2 | 7/2012 | Rouleau et al. |
| 8,260,482 B1 | 9/2012 | Szybalski et al. |
| 8,352,110 B1 | 1/2013 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,114,827 B2 | 8/2015 | Burns, Jr. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,845,106 B2 | 12/2017 | Bodtker et al. |
| 9,852,752 B1 | 12/2017 | Chou et al. |
| 2002/0121153 A1 | 9/2002 | Hoblingre |
| 2002/0189888 A1 | 12/2002 | Magnus et al. |
| 2003/0046012 A1 | 3/2003 | Yamaguchi |
| 2003/0094330 A1 | 5/2003 | Boloorchi et al. |
| 2003/0127276 A1 | 7/2003 | Shimizu et al. |
| 2003/0146037 A1 | 8/2003 | Menjak et al. |
| 2003/0164060 A1 | 9/2003 | Menjak |
| 2003/0188918 A1 | 10/2003 | Shimizu et al. |
| 2003/0192734 A1 | 10/2003 | Bugosh |
| 2003/0227159 A1 | 12/2003 | Muller |
| 2004/0016588 A1 | 1/2004 | Vitale et al. |

(56) References Cited

U.S. PATENT DOCUMENTS

| | | |
|---|---|---|
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0168848 A1 | 9/2004 | Bohner et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0275205 A1 | 12/2005 | Ahnafield |
| 2006/0202462 A1 | 9/2006 | Menjak et al. |
| 2006/0224287 A1 | 10/2006 | Izawa et al. |
| 2006/0244251 A1 | 11/2006 | Muller |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2008/0277178 A1 | 11/2008 | Poli et al. |
| 2009/0024278 A1 | 1/2009 | Kondo et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0029200 A1* | 2/2011 | Shah ............... B62D 5/008 701/41 |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1* | 1/2013 | Gazit ............... B62D 1/28 340/438 |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0319163 A1 | 12/2013 | Davies et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0136055 A1* | 5/2014 | Sugiyama ............... B62D 5/0481 701/42 |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0088357 A1 | 3/2015 | Yopp |
| 2015/0120142 A1 | 4/2015 | Park et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2016/0009311 A1* | 1/2016 | Khale ............... B62D 1/184 74/530 |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1* | 8/2016 | Basting ............... B62D 5/008 |
| 2016/0231743 A1* | 8/2016 | Bendewald ....... B60W 50/0097 |
| 2016/0304123 A1* | 10/2016 | Lewis ............... B62D 5/043 |
| 2016/0318540 A1 | 11/2016 | King |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1* | 12/2016 | Magnus ............... F16H 25/2204 74/493 |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0057541 A1 | 3/2017 | Bodtker et al. |
| 2017/0106894 A1 | 4/2017 | Bodtker |
| 2017/0113712 A1 | 4/2017 | Watz |

FOREIGN PATENT DOCUMENTS

| | | |
|---|---|---|
| CN | 1736786 A | 2/2006 |
| CN | 101037117 A | 9/2007 |
| CN | 101041355 A | 9/2007 |
| CN | 101108629 A | 1/2008 |
| CN | 101213124 A | 7/2008 |
| CN | 101341345 A | 1/2009 |
| CN | 101596903 A | 12/2009 |
| CN | 101674965 A | 3/2010 |
| CN | 101758855 A | 6/2010 |
| CN | 102452391 A | 5/2012 |
| CN | 103359151 A | 10/2013 |
| CN | 103419840 A2 | 12/2013 |
| CN | 103448785 A | 12/2013 |
| CN | 203460923 U | 3/2014 |
| CN | 104044629 A | 9/2014 |
| CN | 104512458 A | 4/2015 |
| CN | 104602989 A | 5/2015 |
| DE | 19523214 A1 | 1/1997 |
| DE | 19625503 C1 | 9/1997 |
| DE | 19923012 A1 | 11/2000 |
| DE | 10020085 C1 | 7/2001 |
| DE | 10036281 A1 | 7/2002 |
| DE | 10212782 A1 | 10/2003 |
| DE | 102005032528 A1 | 1/2007 |
| DE | 102006025254 A1 | 12/2007 |
| DE | 102010025197 A1 | 12/2011 |
| EP | 0339612 A2 | 11/1989 |
| EP | 0857638 A2 | 8/1998 |
| EP | 0931711 A1 | 7/1999 |
| EP | 1559630 A2 | 8/2005 |
| EP | 1783719 A2 | 5/2007 |
| EP | 1932745 A2 | 6/2008 |
| EP | 1990244 A1 | 11/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |

(56) References Cited

FOREIGN PATENT DOCUMENTS

| | | | |
|---|---|---|---|
| JP | S6343846 A | | 2/1988 |
| JP | H05162652 A | | 6/1993 |
| JP | 2000355278 A | | 12/2000 |
| JP | 2004009989 A | * | 1/2004 |
| JP | 2007253809 A | | 10/2007 |
| KR | 20100063433 A | | 6/2010 |
| WO | 2006099483 A1 | | 9/2006 |
| WO | 2010082394 A1 | | 7/2010 |
| WO | 2010116518 A1 | | 10/2010 |
| WO | WO-2015049231 A1 | * | 4/2015 ........ B60W 50/0097 |

OTHER PUBLICATIONS

First Office Action regarding related CN Pat. App. No. 201210599006.6; dated Jan. 27, 2015; 9 pages.
Second Office Action regarding related CN Pat. App. No. 201210599006.6; dated Aug. 5, 2015; 5 pgs.
Second Office Action regarding related CN Pat. App. No. 201310178012.9; dated Dec. 28, 2015; 11 pgs.
First Office Action regarding related CN Pat. App. No. 201410089167; dated Feb. 3, 2016; 9 pgs.
Extended EP Search Report regarding related EP App. No. 14156903.8; dated Jan. 27, 2015; 10 pgs.
Office Action regarding related EP App. No. 14156903.8; dated Nov. 16, 2015; 4 pgs.
Office Action regarding related EP App. No. 14156903.8; dated May 31, 2016; 5 pgs.
Partial Search Report regarding related EP App. No. 14156903.8; dated Sep. 23, 2014; 6 pages.
Extended EP Search Report regarding related EP App. No. 15152834.6; dated Oct. 8, 2015, 7 pages.
Extended EP Search Report regarding related EP App. No. 12196665.9; dated Mar. 6, 2013, 7 pages.
EP Search Report regarding related EP App. No. 13159950.8; dated Jun. 6, 2013; 7 pages.
Gillespie, Thomas D.; "Fundamentals of Vehicle Dynamics"; Society of Automotive Enginers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Partial European Search Report for related European Patent Application No. 14156903.8, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
English translation of Office Action regarding related CN App. No. 201610620332.9; dated Jan. 19, 2018; 9 pgs.
European Office Action for European Application No. 03075462.6 dated Jan. 4, 2010, 4 pages.
Chinese Office Action & Search Report for Chinese Application No. 2016103666609.X dated Dec. 20, 2017, including English Translation, 16 pgs.
Chinese Office Action & Search Report for Chinese Application No. 201610609675.5 dated Feb. 27, 2018, including English translation, 19 pgs.
Chinese Office Action & Search Report for Chinese Application No. 201610774207.3 dated Apr. 4, 2018, including English Translation, 14 pgs.
English Translation of Chinese Office Action and Search Report for Chinese Application No. 201611113748.8 dated May 30, 2018, 12 pages.

* cited by examiner

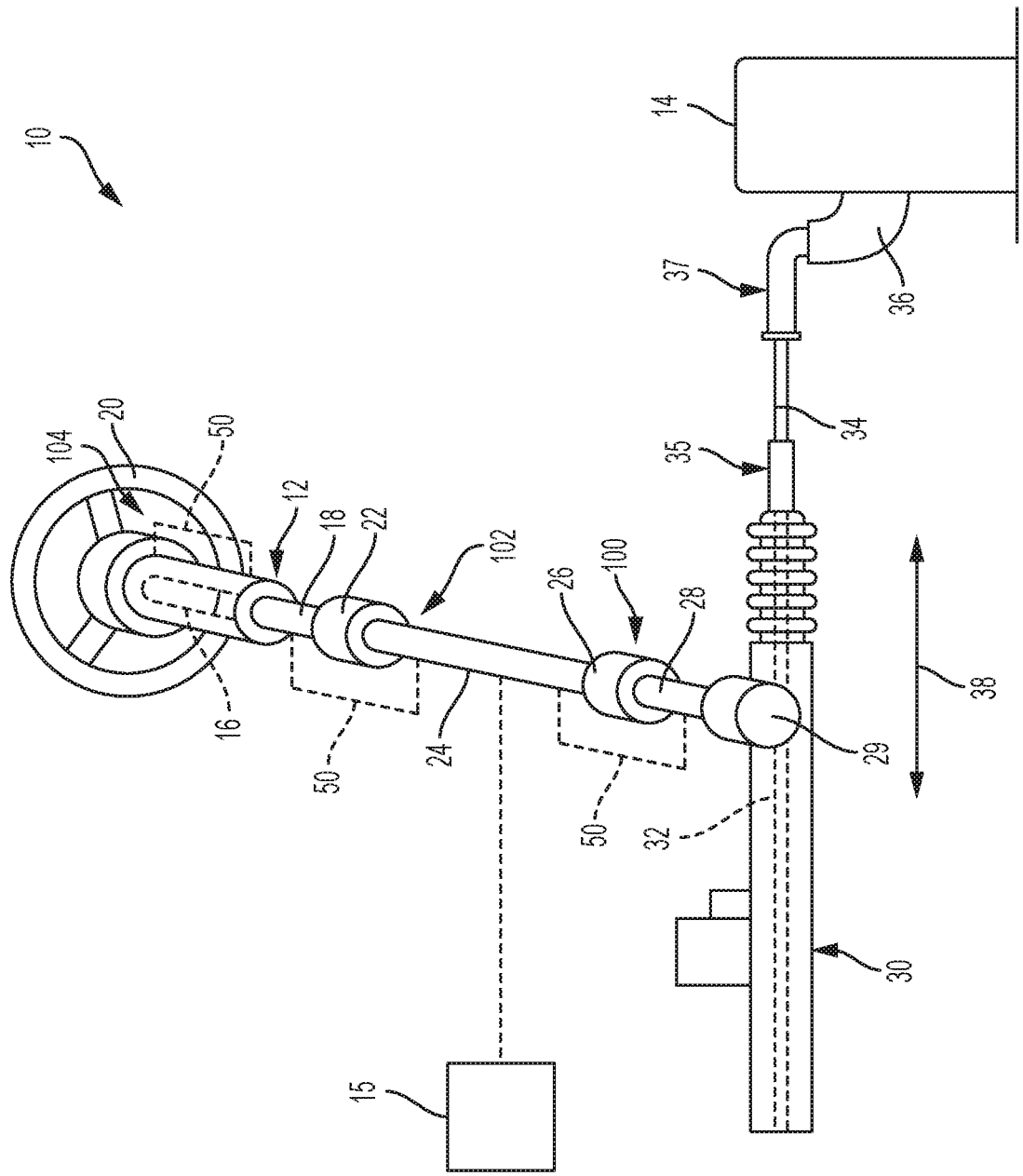

COUNTER ROTATION STEERING WHEEL

CROSS REFERENCE TO RELATED APPLICATION

This patent application claims priority to U.S. Provisional Patent Application Ser. No. 62/155,589, filed May 1, 2015, which is incorporated herein by reference in its entirety.

BACKGROUND

The disclosure herein relates to steering column assemblies and, more specifically, to a steering column assembly with anti-rotation features.

When some vehicles are fitted with systems that allow the vehicle to be driven autonomously, the steering system(s) operate while the steering wheel may be required to rotate while the vehicle is in an autonomous driving mode. The steering wheel may be utilized for non-driving functions (e.g., tray table), but rotation of the steering wheel limits such functionality. "De-clutching" the wheel, or an associated intermediate component, from a steering gear results in disengagement of the wheel, thereby requiring re-engagement if an operator wishes to manually take control of the vehicle.

SUMMARY OF THE INVENTION

In one embodiment of the disclosure, a steering column assembly configured to couple to a steering wheel is provided. The assembly includes a steering column shaft having a first end and a second end, the second end configured to couple to the steering wheel. The assembly also includes an intermediate shaft coupled to the steering column shaft first end. The assembly further includes a steering input pinion coupled to the intermediate shaft. The assembly yet further includes a counter rotation mechanism configured to counter rotate rotational movement of the steering column assembly such that the steering wheel does not rotate.

In another embodiment of the disclosure, a steering column assembly configured to couple to an operator steering input device is provided. The assembly includes a steering column shaft having a first end and a second end, the second end configured to couple to the operator steering input device. The assembly also includes an intermediate shaft coupled to the first end of the steering column shaft. The assembly further includes a counter rotation mechanism configured to counter rotate rotational movement of at least one of the steering column shaft and the intermediate shaft such that the steering input device rotates at the same ratio as the steering column assembly in the opposite rotational direction as the steering column assembly.

In yet another embodiment of the disclosure, a steering column assembly configured to couple to a steering wheel is provided. The assembly includes a steering column shaft having a first end and a second end, the second end configured to couple to the steering wheel. The assembly also includes an intermediate shaft coupled to the steering column shaft first end. The assembly further includes a steering input pinion coupled to the intermediate shaft. The assembly yet further includes a counter rotation mechanism configured to counter rotate rotational movement of the steering column assembly such that the steering wheel does not rotate while maintaining coupling between the steering column shaft, the intermediate shaft and the steering input pinion.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic illustration of a steering column assembly according to one embodiment of the disclosure.

DETAILED DESCRIPTION

Referring now to the FIGURE, where the invention will be described with reference to specific embodiments, without limiting same, FIG. 1 illustrates an exemplary steering system 10 for use in a vehicle (not shown). Steering system 10 enables the operator of the vehicle to control the direction of the vehicle through the manipulation of a steering column assembly 12, which is mechanically connected to road wheels 14. Steering system 10 may also be equipped with a self-steering mechanism 15 such as an Advanced Driver Assistance System (ADAS) or the like.

Steering column assembly 12 generally includes an upper column shaft 16, a lower column shaft 18, a steering wheel 20, an intermediate shaft 24, and a steering gear assembly 30. In the exemplary embodiment, steering wheel 20 is disposed at upper column shaft 16, and steering column assembly 12 is movable between a deployed position and a stowed position. In the deployed position, the operator can apply a rotational force to steering column assembly 12. In the stowed position, portions of steering column assembly 12 such as steering wheel 20 are disposed away from the driver toward a vehicle instrument panel (not shown), which provides increased space for the driver.

A column universal joint 22 couples the lower column shaft 18 to the intermediate shaft 24, which is secured at its other end to a lower column universal joint 26. A pinion shaft 28 is coupled at one end to universal joint 26 and to a pinion gear 29 of steering gear assembly 30 at the other end. Gear assembly 30 also includes an elongate rack 32, and the opposed axial ends of rack 32 are coupled to the vehicle's road wheels 14 (only one shown) through steering linkage that includes tie rods 34 (only one shown) each secured to rack 32 at an inner tie rod end 35, and to one of a pair of steering knuckles 36 (only one shown) at an outer tie rod end 37.

When the vehicle operator turns steering wheel 20 or self-steering mechanism 15 turns some portion of steering column assembly 12, a rotational force is applied to rotate pinion gear 29. The movement of pinion gear 29 causes substantially linear movement of rack 32 in the direction of arrows 38, which in turn manipulates tie rods 34 and knuckles 36 in order to reposition road wheels 14.

In the exemplary embodiment, steering system 10 includes a counter rotation mechanism 50 that is configured to counter-rotate a portion of steering column assembly 12 when the vehicle is in an autonomous, semi-autonomous, or selectively autonomous driving mode, such that no rotation of steering wheel 20 is caused by operation of pinion gear 29. For example, counter rotation mechanism 50 may be a mechanism such as that described in U.S. Pat. No. 6,955,623, the contents of which are incorporated herein by reference in entirety.

Counter rotation mechanism 50 is operably coupled to steering column assembly 12 to actively apply opposite rotation to steering wheel 20 to give the impression that wheel 20 is "locked out" (i.e., not moving). System 10 may include more than one counter rotation mechanism 50 in some embodiments. Counter rotation mechanism 50 may be operably coupled to steering column assembly 12 at various locations in certain embodiments. In some embodiments, mechanism 50 is disposed in a first location 100 between intermediate shaft 24 and pinion gear 29. In other embodiments, a second location 102 for the counter rotation mechanism 50 is between intermediate shaft 24 and steering column shaft 18. In other embodiments, a third location 104 for the counter rotation mechanism 50 is between steering column shaft 16 and steering wheel 20.

In alternative embodiment, counter rotation mechanism 50 may interpose the counter motion within a shaft. For example, mechanism 50 may be disposed within intermediate shaft 24, or within shafts 16, 18.

Accordingly, the disclosure provides steering column assemblies with a counter-rotation mechanism for a vehicle equipped with an Advanced Driver Assistance System (ADAS) or the like.

In one embodiment, the steering system enables the steering wheel to be stationary (non-rotating) when in the ADAS mode or self-steering mode, by using the counter rotation mechanism such as an "Active Front Steer" mechanism. As the self-steering mechanism guides the vehicle along its route, the steering gear (e.g., rack & pinion) input shaft rotates. However, the counter rotation mechanism, which may be positioned between the steering column shaft and the gear input shaft, counter-rotates the same or substantially the same degree to cause no visible rotation of the steering wheel to the operator.

Accordingly, the counter rotation mechanism actively applies opposite rotation to the wheel to give the impression the wheel is not rotating and not engaged to column shaft 16. As such, one advantage is that the wheel and steering system is always available for taking manual control of the vehicle by an operator.

The counter rotation mechanism may be located between the I-shaft and the steering input pinion, between the I-shaft and the column steering shaft, and/or between the column steering shaft and the wheel. The counter rotation mechanism may also be located to interpose the counter motion within a shaft, such as the I-shaft or the steering shaft, which may require separation of components.

Accordingly, the counter rotation mechanism facilitates variable ratio steering and enables zero ratio steering.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly configured to couple to a steering wheel, the assembly comprising:
   a steering column shaft having a first end and a second end, the second end configured to couple to the steering wheel;
   an intermediate shaft coupled to the steering column shaft first end;
   a steering input pinion coupled to the intermediate shaft; and
   a counter rotation mechanism causing a non-rotational condition of the steering wheel via counter rotational movement of the steering column assembly during rotation of the steering input pinion.

2. The steering column assembly of claim 1, wherein the counter rotation mechanism is positioned between the intermediate shaft and the steering input pinion.

3. The steering column assembly of claim 1, wherein the counter rotation mechanism is positioned between the intermediate shaft and the steering column shaft.

4. The steering column assembly of claim 1, wherein the counter rotation mechanism is positioned between the steering column shaft and the steering wheel.

5. The steering column assembly of claim 1, wherein the counter rotation mechanism is positioned within the intermediate shaft.

6. The steering column assembly of claim 1, wherein the counter rotation mechanism is positioned within the steering column shaft.

7. The steering column assembly of claim 1, further comprising a self-steering mechanism operably coupled to the steering column assembly, the self-steering mechanism configured to rotate the steering column assembly during an autonomous driving mode.

8. The steering column assembly of claim 1, wherein the steering column assembly is movable between a deployed position where a driver may manually rotate the steering wheel, and a stowed, anti-rotation position where the counter rotation mechanism is active to cause the non-rotational condition of the steering wheel.

9. A steering column assembly configured to couple to an operator steering input device, the assembly comprising:
   a steering column shaft having a first end and a second end, the second end configured to couple to the operator steering input device;
   an intermediate shaft coupled to the first end of the steering column shaft; and
   a counter rotation mechanism configured to counter rotate rotational movement of at least one of the steering column shaft and the intermediate shaft such that the steering input device rotates at the same ratio as the steering column assembly in the opposite rotational direction as the steering column assembly to counter rotatively cause a non-rotational condition of the steering input device to maintain the steering input device in a single angular position during rotation of the steering column shaft.

10. The steering column assembly of claim 9, wherein the counter rotation mechanism is disposed within the steering column shaft.

11. The steering column assembly of claim 9, wherein the counter rotation mechanism is disposed within the intermediate shaft.

12. The steering column assembly of claim 9, further comprising a self-steering mechanism operably coupled to the steering column assembly, the self-steering mechanism configured to rotate the steering column assembly during an autonomous driving mode.

13. The steering column assembly of claim 9, wherein the steering column assembly is movable between a deployed position where a driver may manually rotate the operator steering input device, and a stowed, anti-rotation position where the counter rotation mechanism is active to cause the non-rotational condition of the steering wheel.

14. A steering column assembly configured to couple to a steering wheel, the assembly comprising:
   a steering column shaft having a first end and a second end, the second end configured to couple to the steering wheel;
   an intermediate shaft coupled to the steering column shaft first end;
   a steering input pinion coupled to the intermediate shaft; and
   a counter rotation mechanism configured to counter rotate rotational movement of the steering column assembly to counter rotatively cause a non-rotational condition of the steering wheel during rotation of the steering input pinion while maintaining coupling between the steering column shaft, the intermediate shaft and the steering input pinion.

15. The steering column assembly of claim 14, wherein the counter rotation mechanism is positioned between the intermediate shaft and the steering input pinion.

16. The steering column assembly of claim 14, wherein the counter rotation mechanism is positioned between the intermediate shaft and the steering column shaft.

17. The steering column assembly of claim 14, wherein the counter rotation mechanism is positioned between the steering column shaft and the steering wheel.

18. The steering column assembly of claim 14, further comprising a self-steering mechanism operably coupled to the steering column assembly, the self-steering mechanism configured to rotate the steering column assembly during an autonomous driving mode.

19. The steering column assembly of claim 14, wherein the steering column assembly is movable between a deployed position where a driver may manually rotate the steering wheel, and a stowed, anti-rotation position where the counter rotation mechanism is active to cause the non-rotational condition of the steering wheel.

* * * * *